(12) United States Patent
Daoud

(10) Patent No.: US 6,183,010 B1
(45) Date of Patent: Feb. 6, 2001

(54) ACCIDENT PREVENTION SYSTEM FOR VEHICLES

(76) Inventor: Omar M. Daoud, 8225 W. 30th St., North Riverside, IL (US) 60546

(*) Notice: Under 35 U.S.C. 154(b), the term of this patent shall be extended for 0 days.

(21) Appl. No.: 09/321,165

(22) Filed: May 27, 1999

(51) Int. Cl.$^7$ .................................................. B60S 9/02
(52) U.S. Cl. .................................................. 280/766.1
(58) Field of Search ................... 280/766.1, 763.1, 280/767; 340/442, 443

(56) References Cited

U.S. PATENT DOCUMENTS

| | | | |
|---|---|---|---|
| 1,638,983 | * 8/1927 | Crone | 340/442 |
| 2,452,110 | * 10/1948 | Dourte | 280/150 |
| 2,460,178 | * 1/1949 | Kember | 180/1 |
| 2,478,653 | * 9/1949 | Callan | 280/450 |
| 2,608,430 | * 8/1952 | Robert | 280/767 |
| 3,642,242 | * 2/1972 | Danekas | 248/354 |
| 3,826,322 | * 7/1974 | Williams | 180/1 |
| 4,605,086 | * 8/1986 | Marom | 180/202 |
| 5,143,386 | * 9/1992 | Uriarte | 280/6.1 |

* cited by examiner

*Primary Examiner*—Brian L. Johnson
*Assistant Examiner*—G B Klebe

(57) ABSTRACT

An accident prevention system for vehicles for stabilizing a vehicle when a tire loses pressure. The accident prevention system for vehicles includes a plurality of piston and cylinder actuators each positioned towards a unique tire of a vehicle. Lower ends of the piston and cylinder actuators are adapted for engaging a ground surface when the pistons are in an extended position. A plurality of sensors are each positioned towards a unique tire of the vehicle. Each of the sensors becomes activated when the associated tire goes flat. Each piston moves towards an extended position when the associated sensor is activated.

9 Claims, 3 Drawing Sheets

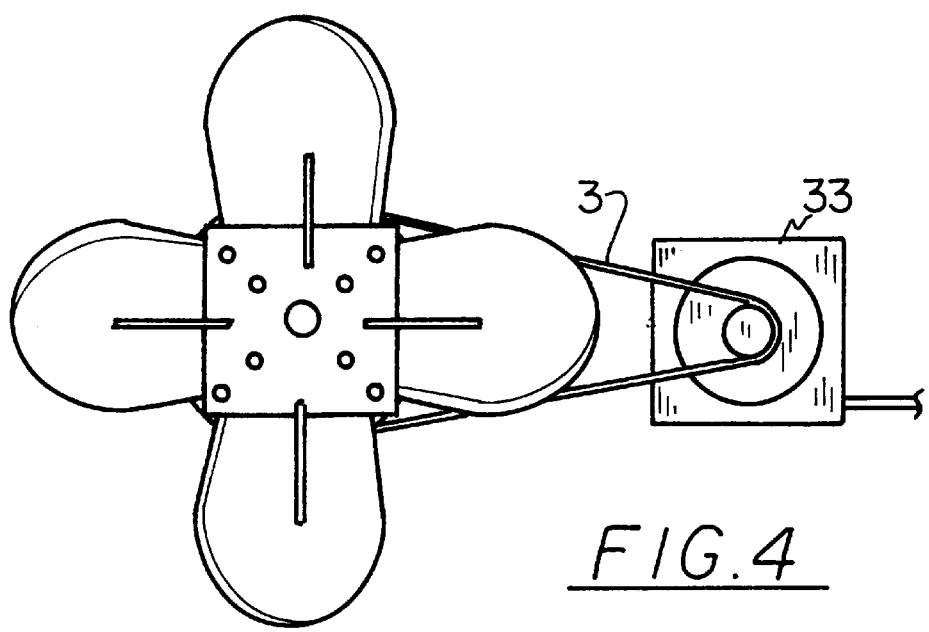
FIG.4
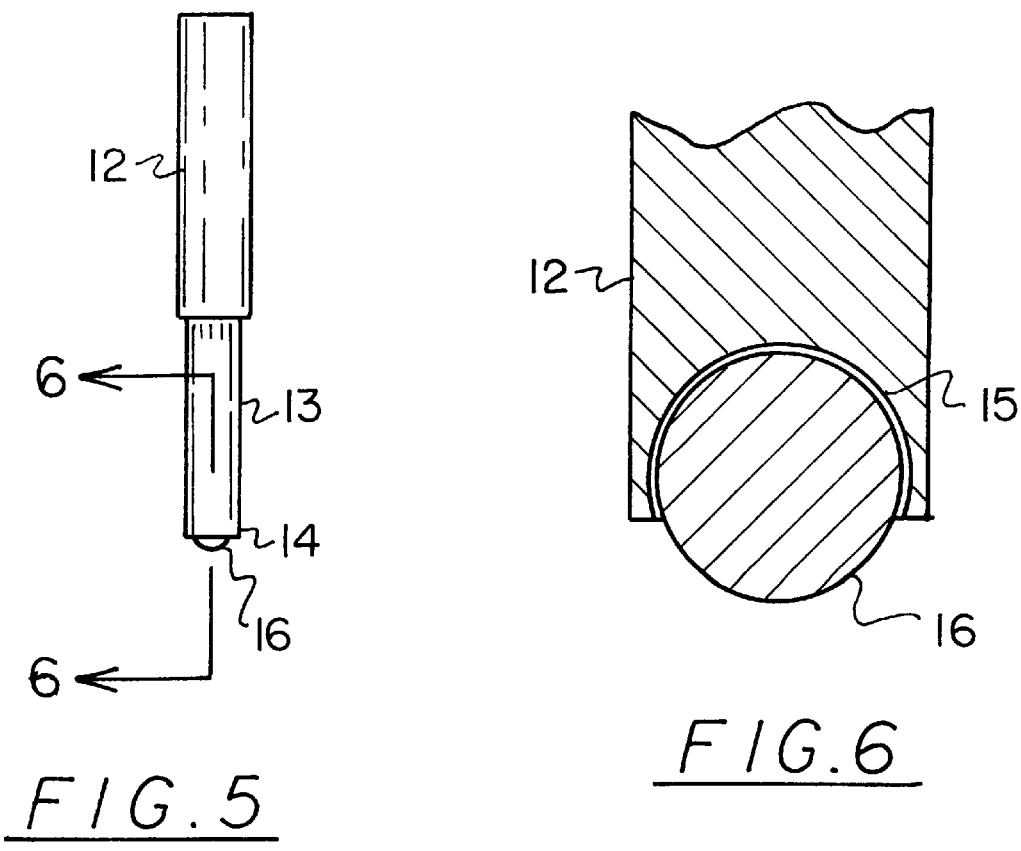
FIG.5
FIG.6

ACCIDENT PREVENTION SYSTEM FOR VEHICLES

BACKGROUND OF THE INVENTION

1. Field of the Invention

The present invention relates to vehicle safety devices and more particularly pertains to a new accident prevention system for vehicles for stabilizing a vehicle when a tire loses pressure.

2. Description of the Prior Art

The use of vehicle safety devices is known in the prior art. More specifically, vehicle safety devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,826,322; 3,120,398; 4,605,086; 4,711,464; 3,003,571; and 2,784,793.

While these devices fulfill their respective, particular objectives and requirements, the aforementioned patents do not disclose a new accident prevention system for vehicles. The inventive device includes a plurality of piston and cylinder actuators each positioned towards a unique tire of a vehicle. Lower ends of the piston and cylinder actuators are adapted for engaging a ground surface when the pistons are in an extended position. A plurality of sensors are each positioned towards a unique tire of the vehicle. Each of the sensors becomes activated when the associated tire goes flat. Each piston moves towards an extended position when the associated sensor is activated.

In these respects, the accident prevention system for vehicles according to the present invention substantially departs from the conventional concepts and designs of the prior art, and in so doing provides an apparatus primarily developed for the purpose of stabilizing a vehicle when a tire loses pressure.

SUMMARY OF THE INVENTION

In view of the foregoing disadvantages inherent in the known types of vehicle safety devices now present in the prior art, the present invention provides a new accident prevention system for vehicles construction wherein the same can be utilized for stabilizing a vehicle when a tire loses pressure.

The general purpose of the present invention, which will be described subsequently in greater detail, is to provide a new accident prevention system for vehicles apparatus and method which has many of the advantages of the vehicle safety devices mentioned heretofore and many novel features that result in a new accident prevention system for vehicles which is not anticipated, rendered obvious, suggested, or even implied by any of the prior art vehicle safety devices, either alone or in any combination thereof.

To attain this, the present invention generally comprises a plurality of piston and cylinder actuators each positioned towards a unique tire of a vehicle. Lower ends of the piston and cylinder actuators are adapted for engaging a ground surface when the pistons are in an extended position. A plurality of sensors are each positioned towards a unique tire of the vehicle. Each of the sensors becomes activated when the associated tire goes flat. Each piston moves towards an extended position when the associated sensor is activated.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new accident prevention system for vehicles apparatus and method which has many of the advantages of the vehicle safety devices mentioned heretofore and many novel features that result in a new accident prevention system for vehicles which is not anticipated, rendered obvious, suggested, or even implied by any of the prior art vehicle safety devices, either alone or in any combination thereof.

It is another object of the present invention to provide a new accident prevention system for vehicles which may be easily and efficiently manufactured and marketed.

It is a further object of the present invention to provide a new accident prevention system for vehicles which is of a durable and reliable construction.

An even further object of the present invention is to provide a new accident prevention system for vehicles which is susceptible of a low cost of manufacture with regard to both materials and labor, and which accordingly is then susceptible of low prices of sale to the consuming public, thereby making such accident prevention system for vehicles economically available to the buying public.

Still yet another object of the present invention is to provide a new accident prevention system for vehicles which provides in the apparatuses and methods of the prior art some of the advantages thereof, while simultaneously overcoming some of the disadvantages normally associated therewith.

Still another object of the present invention is to provide a new accident prevention system for vehicles for stabilizing a vehicle when a tire loses pressure.

Yet another object of the present invention is to provide a new accident prevention system for vehicles which includes a plurality of piston and cylinder actuators each positioned towards a unique tire of a vehicle. Lower ends of the piston and cylinder actuators are adapted for engaging a ground surface when the pistons are in an extended position. A plurality of sensors are each positioned towards a unique tire of the vehicle. Each of the sensors becomes activated when the associated tire goes flat. Each piston moves towards an extended position when the associated sensor is activated.

Still yet another object of the present invention is to provide a new accident prevention system for vehicles that saves lives during a tire blowout by supporting a corner of a vehicle which permits the driver to pull the vehicle off of the roadway.

Even still another object of the present invention is to provide a new accident prevention system for vehicles that also operates as an integrated jack.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a schematic side view of a pressure pump of the present invention.

FIG. 5 is a schematic side view of a piston and cylinder assembly of the present invention.

FIG. 6 is a schematic cross sectional view of the present invention taken from line 6—6 of FIG. 5.

DESCRIPTION OF THE PREFERRED EMBODIMENT

Figure 1:
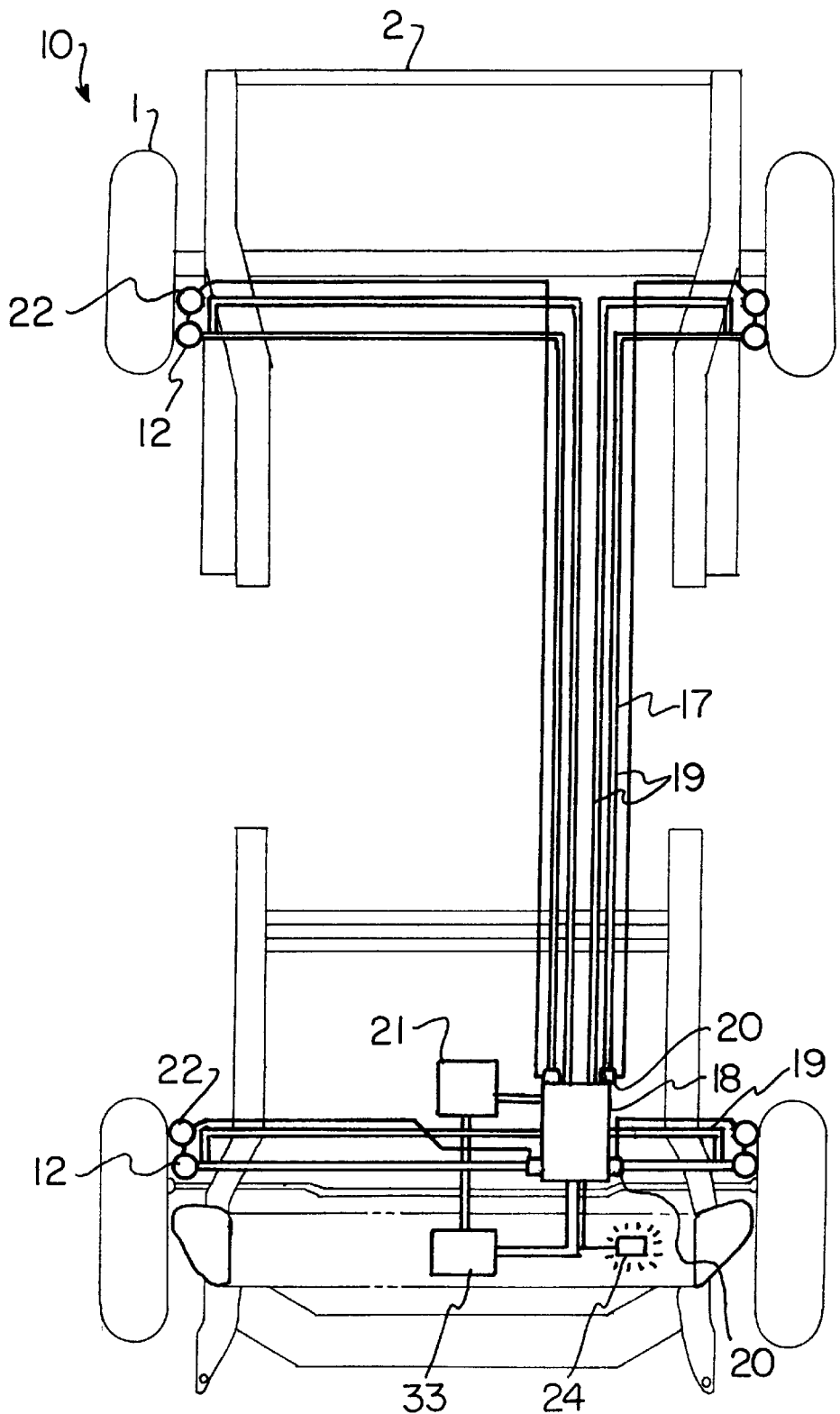
FIG. 1 is a schematic top view of a new accident prevention system for vehicles according to the present invention.

With reference now to the drawings, and in particular to FIGS. 1 through 6 thereof, a new accident prevention system for vehicles embodying the principles and concepts of the present invention and generally designated by the reference numeral 10 will be described.

As best illustrated in FIGS. 1 through 6, the accident prevention system for vehicles 10 generally comprises a plurality of piston and cylinder actuators 12 each positioned towards a unique tire 1 of a vehicle 2. Ideally, the piston and cylinder actuators are mounted to the frame or suspension of the vehicle. The piston and cylinder actuators adjacent the front tires should be mounted to the suspension so that they turn with the tire.

Figure 2:
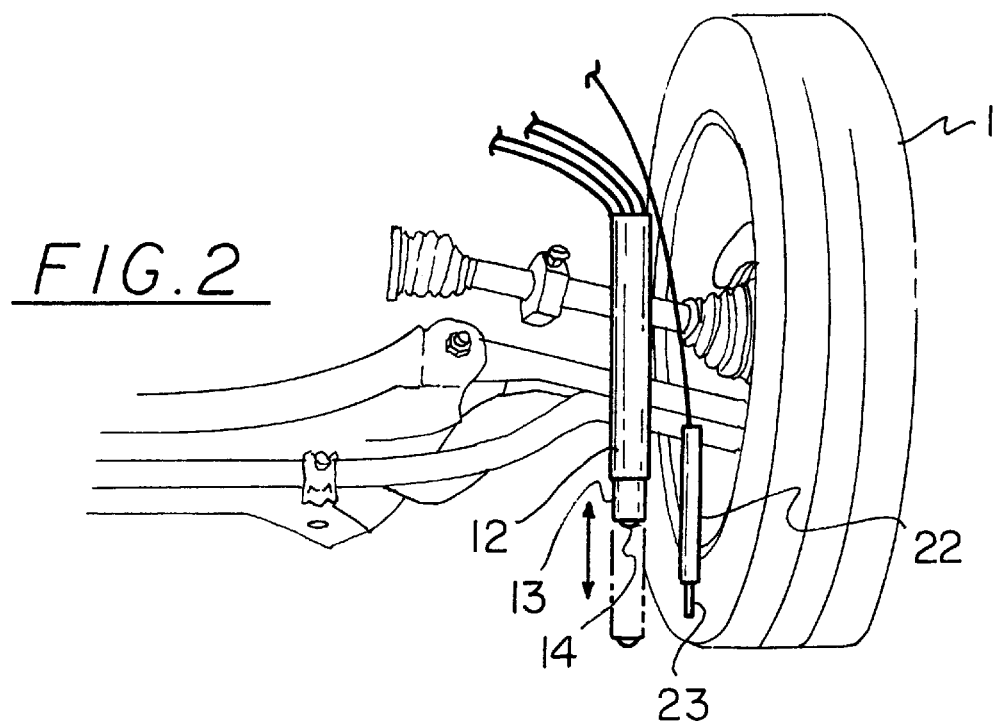
FIG. 2 is a schematic partial perspective view of the present invention.
Figure 3:
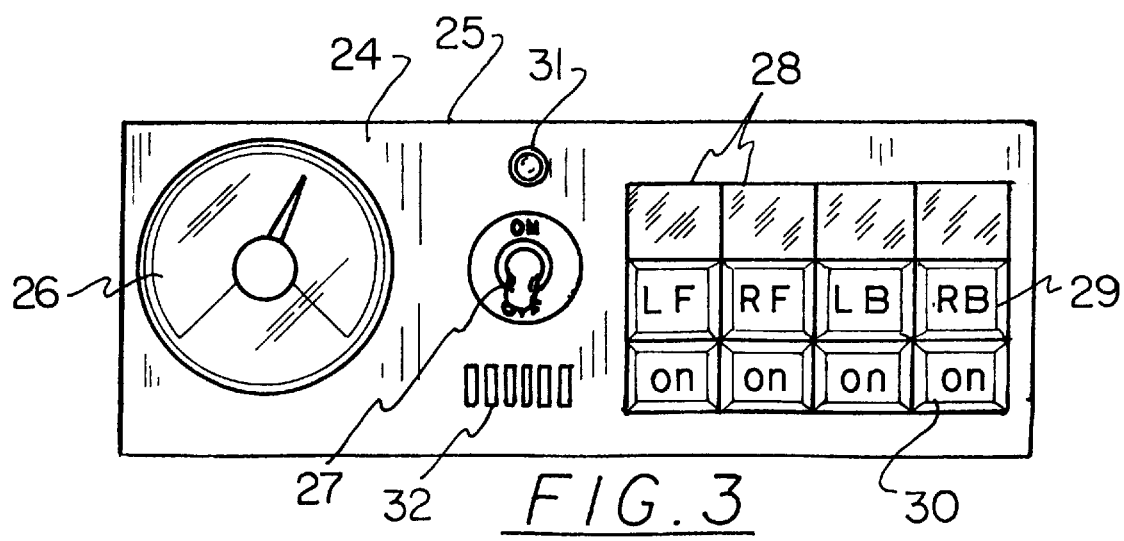
FIG. 3 is a schematic of the face of a control panel of the present invention.

The pistons 13 of the piston and cylinder actuators are positionable between an extended position and a retracted position. Lower ends 14 of the piston and cylinder actuators are adapted for engaging a ground surface when the pistons are in the extended position. FIG. 2 shows the piston in the retracted position. The extended position is shown in dashed outline. Ideally, a fully inflated tire will be positioned between about ½ and 1 inch above the ground when the associated piston is positioned in the extended position. This permits each piston and cylinder actuator to function as a jack to permit easy changing of the flat tire, or even for simple maintenance when there is no problem with the tires.

Preferably, the lower end of each of the piston and cylinder actuators has a socket 15 and a ball 16 rotatably received in the socket for rolling along a ground surface. See FIG. 6. This configuration is most desired because it requires less space than most other types of rollers, especially wheeled rollers.

Also preferably, a piping system 17 and hydraulic pressure are used to operate the piston and cylinder actuators. The piping system has a separator 18 in fluid communication with a pump 33 that pumps hydraulic fluid, a plurality of pairs of tubes 19 extending between the piston and cylinder actuators and the separator, a plurality of solenoid valves 20 each selectively permitting the hydraulic fluid to flow through one of the tubes of a particular pair of tubes for actuating the associated piston and cylinder actuator, and a fluid reservoir 21 in fluid communication with the pump and the separator. The pump may be operated by the fan belt 3, as shown in FIG. 4, or may be driven by the crank shaft, for example. The separator being for separating one of the plurality of tubes from the rest of the tubes such that each one of the cylinder actuators can be actuated individually.

Alternatively, electronic solenoid-type piston and cylinder actuators (not shown) of a type known in the art may be used instead of requiring a hydraulic system to operate the piston and cylinder actuators.

A plurality of sensors 22 are each positioned towards a unique tire of the vehicle. Each of the sensors produces a mechanical or electrical signal when the associated tire goes flat. The sensors may be mechanically or optically activated. Preferably, each of the sensors has a pin 23 telescopically extending from it that is pushed by the ground during a blowout, which activates the sensor, such as by closing a switch of the sensor.

In the simplest embodiment of the invention, each of the sensors is in communication with the solenoid valve which operates the piston and cylinder actuator adjacent the sensor such that the piston moves to the extended position when the sensor is activated.

Preferably, a control panel 24 is provided in the interior of the vehicle, such as on the dash board. The control panel has a controller 25 in electrical communication with the solenoid valves and also in electrical or mechanical communication with the sensors via wires.

The control panel should also have one or more of the following: a pressure gauge 26 for permitting monitoring of fluid pressure in the piping system, a power switch 27 for turning the controller off and on, a plurality of indicator lights 28 for indicating which solenoid valve is open, a plurality of valve reset buttons 29 for closing the solenoid valves after they've been opened for any reason, and a plurality of manual actuation buttons 30 for manually opening the solenoid valves to use the associated piston and cylinder actuator as a jack. The control panel may also have a power light 31 to indicate whether the system is on or off and a buzzer 32 that emits audible sound when a sensor is activated. All of these components are in electrical and/or mechanical communication with the controller.

Upon receipt of a signal from one of the sensors, the controller opens the proper solenoid valve to permit hydraulic fluid to flow to the piston and cylinder actuator adjacent the activated sensor, permitting the hydraulic fluid to move the piston adjacent the tire into the extended position. Thus, the corner of the car with the flat tire is supported by the piston and cylinder actuator and a driver is able to maneuver the vehicle to bring it to a stop. The piston remains in the extended position until the associated valve reset button is pushed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A safety system for a vehicle, the system comprising, in combination:

a plurality of piston and cylinder actuators each positioned towards a unique tire of a vehicle, lower ends of said piston and cylinder actuators being adapted for engaging a ground surface when said pistons are in an extended position;

a plurality of sensors each positioned towards a unique tire of the vehicle and associated with the adjacent piston and cylinder actuator, each of the sensors becoming activated when the associated tire goes flat, each piston moving towards an extended position when the associated sensor is activated; and wherein said lower end of each of said piston and cylinder actuators has a socket and a ball rotatable received in said socket for rolling along a ground surface.

2. The system of claim 1, further comprising a piping system having a plurality of tubes extending between said piston and cylinder actuators and a pump, a plurality of solenoid valves for selectively permitting hydraulic fluid to flow through said tubes for actuating the associated piston and cylinder actuators, and a fluid reservoir in fluid communication with said pump and a separator.

3. The system of claim 2, further comprising a control panel having a controller in electrical communication with said solenoid valves and in communication with said sensors.

4. The system of claim 3, wherein said control panel has a pressure gauge for permitting monitoring of fluid pressure in said piping system.

5. The system of claim 3, wherein said control panel has a power switch for turning said controller off and on.

6. The system of claim 3, wherein said control panel has a plurality of indicator lights for indicating which solenoid valve is open.

7. The system of claim 3, wherein said control panel has a plurality of valve reset buttons for selectively closing said solenoid valves.

8. The system of claim 3, wherein said control panel has a plurality of manual actuation buttons for manually opening said solenoid valves.

9. A safety system for a vehicle, the system comprising, in combination:

a plurality of piston and cylinder actuators each positioned towards a unique tire of a vehicle;

pistons of said piston and cylinder actuators being positionable between an extended position and a retracted position, lower ends of said piston and cylinder actuators being adapted for engaging a ground surface when said pistons are in said extended position;

said lower end of each of said piston and cylinder actuators having a socket and a ball rotatably received in said socket for rolling along a ground surface;

a pump for pumping hydraulic fluid;

a piping system having a separator in fluid communication with said pump, a plurality of pairs of tubes extending between said piston and cylinder actuators and said separator, a plurality of solenoid valves for selectively permitting said hydraulic fluid to flow through one of the tubes of a particular pair of tubes for actuating the associated piston and cylinder actuator, and a fluid reservoir in fluid communication with said pump and said separator;

a plurality of sensors each positioned towards a unique tire of a vehicle, each of the sensors producing a signal when the associated tire goes flat;

a control panel having a controller in electrical communication with said solenoid valves and in communication with said sensors;

wherein upon receipt of a signal from one of the sensors, the controller opens one of the solenoid valves to permit hydraulic fluid to flow to the piston and cylinder actuator adjacent the activated sensor permitting the hydraulic fluid to move the piston adjacent the tire into the extended position;

said control panel having a pressure gauge for permitting monitoring of fluid pressure in said piping system, a power switch for turning said controller off and on, a plurality of indicator lights for indicating which solenoid valve is open, a plurality of valve reset buttons for selectively closing said solenoid valves, and a plurality of manual actuation buttons for manually opening said solenoid valves.

* * * * *